United States Patent
Chin et al.

(10) Patent No.: US 8,977,263 B2
(45) Date of Patent: Mar. 10, 2015

(54) OVERALL SYSTEM SELECTION FOR USER EQUIPMENT WITH MULTIPLE INTERNATIONAL MOBILE SUBSCRIBER IDENTITIES

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 12/964,475

(22) Filed: Dec. 9, 2010

(65) Prior Publication Data

US 2012/0052911 A1  Mar. 1, 2012

Related U.S. Application Data

(60) Provisional application No. 61/379,258, filed on Sep. 1, 2010.

(51) Int. Cl.
*H04W 4/00* (2009.01)
*H04W 48/18* (2009.01)
*H04W 8/18* (2009.01)

(52) U.S. Cl.
CPC .............. *H04W 48/18* (2013.01); *H04W 4/003* (2013.01); *H04W 8/18* (2013.01)
USPC .......................... 455/435.3; 455/415; 455/558

(58) Field of Classification Search
CPC .............. H04M 3/387; H04M 17/106; H04M 2215/7209
See application file for complete search history.

(56) References Cited

U.S. PATENT DOCUMENTS

| | | | | |
|---|---|---|---|---|
| 8,346,255 B2 * | 1/2013 | Kukuchka et al. | ......... | 455/435.2 |
| 2005/0113088 A1 * | 5/2005 | Zinn et al. | ................... | 455/435.2 |

(Continued)

FOREIGN PATENT DOCUMENTS

| | | | |
|---|---|---|---|
| EP | 1739992 A1 * | 7/2005 | |
| WO | WO2008001061 A1 | 1/2008 | |

OTHER PUBLICATIONS

"3rd Generation Partnership Project; Technical Specification Group Core Network and Terminals; Characteristics of the Universal Subscriber Identity Module (USIM) application (Release 9 )", 3GPP Standard; 3GPP TS 31.102, 3rd Generation Partnership Project (3GPP), Mobile Competence Centre ; 650, Route Des Lucioles ; F-06921 Sophia-Antipolis Cedex ; France, No. V9.3.0, Jun. 18, 2010, pp. 1-212, XP050441936,—[retrieved on Jun. 18, 2010] chapter 1 "Scope" chapter 4.2.53 "EFoplmnwact (Operator controlled PLMN selector with Access Technology)" chapter 4.2.54 "EFhplmnwact (HPLMN selector with Access Technology)" chapter 5.3.20 "Operator controlled PLMN selector with Access Technology" chapter 5.3.21 "HPLMN selector with Access Technology".

(Continued)

*Primary Examiner* — Rafael Pérez-Gutiérrez
*Assistant Examiner* — Keith Fang
(74) *Attorney, Agent, or Firm* — Kristine U. Ekwueme

(57) ABSTRACT

Wireless communication in a radio access network may be implemented in a manner where a user equipment (UE) with multiple Universal Subscriber Identity Modules (USIMs) selects a system based on the system's preference status among the USIMs of the UE. A system that is home to all the UE's USIMs is selected over one that is home to some USIMs but roaming for others. A system that is home to some USIMs but not provisioned for other USIMs is selected over one that is roaming to all USIMs. A system that is roaming to all USIMs is selected over one that is roaming to some USIMs but not provisioned for other USIMs. Ranking of systems may be done independently by USIM or may be done using a combined ranking method that considers other USIMs prior to an individual USIM indicating a system priority. Manual system selection may also be used.

13 Claims, 12 Drawing Sheets

| IMSI_1 | | | IMSI_2 | | | Ranking of a PLMN |
|---|---|---|---|---|---|---|
| Home | Roaming | Not in PLMN DB | Home | Roaming | Not in PLMN DB | |
| X | | | X | | | 1 |
| X | | | | X | | 2 |
| | X | | X | | | 2 |
| X | | | | | X | 3 |
| | | X | X | | | 3 |
| | X | | | X | | 4 |
| | X | | | | X | 5 |
| | | X | | X | | 5 |

(56) References Cited

U.S. PATENT DOCUMENTS

2007/0191006 A1* 8/2007 Carpenter ............... 455/435.2
2007/0281687 A1* 12/2007 Jiang ....................... 455/433
2009/0116441 A1 5/2009 Park et al.
2009/0186651 A1* 7/2009 You ......................... 455/552.1
2009/0264094 A1* 10/2009 Smith ...................... 455/404.2
2010/0279698 A1* 11/2010 Wong ...................... 455/450
2011/0081951 A1* 4/2011 Hwang .................... 455/558
2011/0223921 A1* 9/2011 Pan ......................... 455/445

OTHER PUBLICATIONS

International Search Report and Written Opinion—PCT/US2011/049447—ISA/EPO—Mar. 5, 2012.

* cited by examiner

|  | IMSI_1 | | | IMSI_2 | | | Ranking of a PLMN |
|---|---|---|---|---|---|---|---|
|  | Home | Roaming | Not in PLMN DB | Home | Roaming | Not in PLMN DB |  |
|  | X |  |  | X |  |  | 1 |
|  | X |  |  |  | X |  | 2 |
|  | X |  |  |  |  | X | 2 |
|  |  | X |  | X |  |  | 3 |
|  |  | X |  |  | X |  | 3 |
|  |  | X |  |  |  | X | 4 |
|  |  |  | X |  | X |  | 5 |
|  |  |  | X |  |  | X | 5 |

*FIG. 5*

OVERALL SYSTEM SELECTION FOR USER EQUIPMENT WITH MULTIPLE INTERNATIONAL MOBILE SUBSCRIBER IDENTITIES

CROSS REFERENCE TO RELATED APPLICATION

This application claims the benefit of U.S. provisional patent application No. 61/379,258 filed Sep. 1, 2010, in the names of CHIN et al., the disclosure of which is expressly incorporated herein by reference in its entirety.

BACKGROUND

1. Field

Aspects of the present disclosure relate generally to wireless communication systems, and more particularly, to selecting a network for a user equipment (UE) with multiple Universal Subscriber Identity Modules (USIMs).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure a method of wireless communication includes obtaining a first priority system from a first system list of a first International Mobile Subscriber Identity (IMSI), obtaining a second priority system from a second system list of a second IMSI, and selecting an overall system from the first priority system and the second priority system.

In another aspect of the disclosure, a method of wireless communication includes prioritizing a first system list database of a first IMSI based on whether systems in the first system list database are common to a second system list database of a second IMSI and prioritizing the second system list database of the second IMSI based on whether systems in the second system list database are common to the first system list database of the first IMSI. The method also includes obtaining a first priority system from the first prioritized system list database of the first IMSI, obtaining a second priority system from the second prioritized system list database of the second IMSI, and selecting an overall system from the first priority system and the second priority system.

In another aspect of the disclosure, a method of wireless communication includes obtaining a list of wireless communication systems available to a user equipment (UE), displaying the list of available wireless communication systems along with a provisioned status of each system relative to a plurality of IMSIs of the UE, and receiving an indication of which system to use.

In another aspect of the disclosure, a system is configured for wireless communication in a multicarrier radio access network. The system includes means for obtaining a first priority system from a first system list of a first IMSI, means for obtaining a second priority system from a second system list of a second IMSI, and means for selecting an overall system from the first priority system and the second priority system.

In another aspect of the disclosure, a system is configured for wireless communication in a multicarrier radio access network. The system includes means for prioritizing a first system list database of a first IMSI based on whether systems in the first system list database are common to a second system list database of a second IMSI and means for prioritizing the second system list database of the second IMSI based on whether systems in the second system list database are common to the first system list database of the first IMSI. The system also includes means for obtaining a first priority system from the first prioritized system list database of the first IMSI, means for obtaining a second priority system from the second prioritized system list database of the second IMSI, and means for selecting an overall system from the first priority system and the second priority system.

In another aspect of the disclosure, a system is configured for wireless communication in a multicarrier radio access network. The system includes means for obtaining a list of wireless communication systems available to a UE, means for displaying the list of available wireless communication systems along with a provisioned status of each system relative to a plurality of IMSIs of the UE, and means for receiving an indication of which system to use.

In another aspect of the disclosure, a computer program product includes a computer-readable medium having program code recorded thereon. The program code includes code to obtain a first priority system from a first system list of a first IMSI, obtain a second priority system from a second system list of a second IMSI, and select an overall system from the first priority system and the second priority system.

In another aspect of the disclosure, a computer program product includes a computer-readable medium having program code recorded thereon. The program code includes code to prioritize a first system list database of a first IMSI based on whether systems in the first system list database are common to a second system list database of a second IMSI and to prioritize the second system list database of the second IMSI based on whether systems in the second system list database are common to the first system list database of the first IMSI. The program code also includes code to obtain a first priority system from the first prioritized system list database of the first IMSI, obtain a second priority system from the second prioritized system list database of the second IMSI, and select an overall system from the first priority system and the second priority system.

In another aspect of the disclosure, a computer program product includes a computer-readable medium having program code recorded thereon. The program code includes code to obtain a list of wireless communication systems available to a UE, display the list of available wireless communication systems along with a provisioned status of each system relative to a plurality of IMSIs of the UE, and receive an indication of which system to use.

In another aspect of the disclosure, a network controller for wireless communication includes at least one processor and a memory coupled to the processor. The processor is configured to obtain a first priority system from a first system list of a first IMSI, obtain a second priority system from a second system list of a second IMSI, and select an overall system from the first priority system and the second priority system.

In another aspect of the disclosure, a network controller for wireless communication includes at least one processor and a memory coupled to the processor. The processor is configured to prioritize a first system list database of a first IMSI based on whether systems in the first system list database are common to a second system list database of a second IMSI and to prioritize the second system list database of the second IMSI based on whether systems in the second system list database are common to the first system list database of the first IMSI. The processor is also configured to obtain a first priority system from the first prioritized system list database of the first IMSI, obtain a second priority system from the second prioritized system list database of the second IMSI, and select an overall system from the first priority system and the second priority system.

In another aspect of the disclosure, a network controller for wireless communication includes at least one processor and a memory coupled to the processor. The processor is configured to obtain a list of wireless communication systems available to a UE, display the list of available wireless communication systems along with a provisioned status of each system relative to a plurality of IMSIs of the UE, and receive an indication of which system to use.

BRIEF DESCRIPTION OF THE DRAWINGS

FIG. 5 is a table illustrating network ranking according to one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
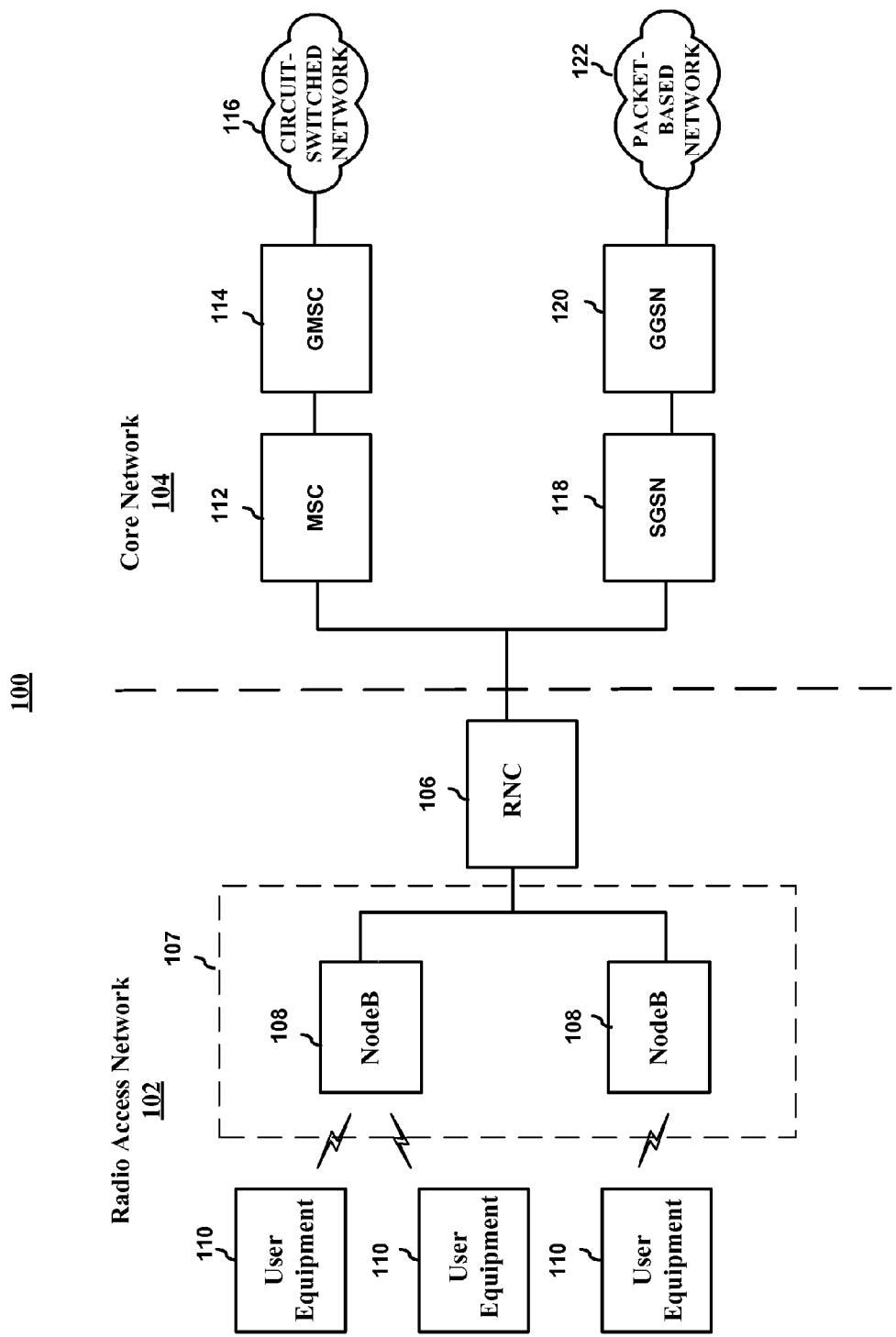
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
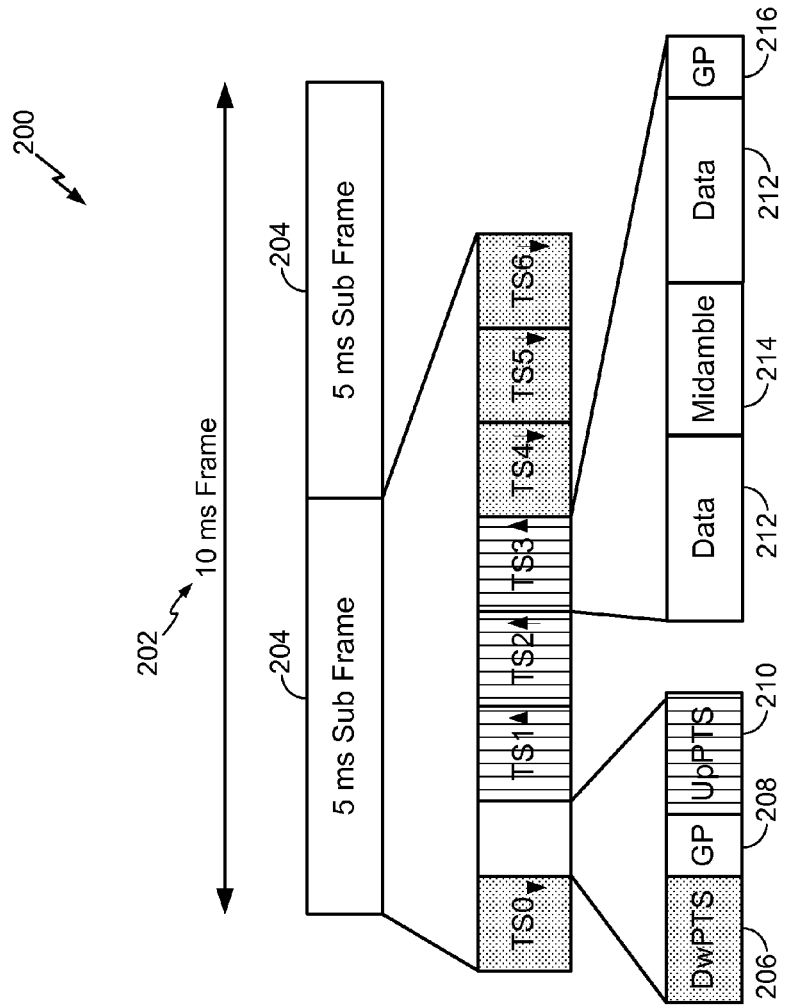
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
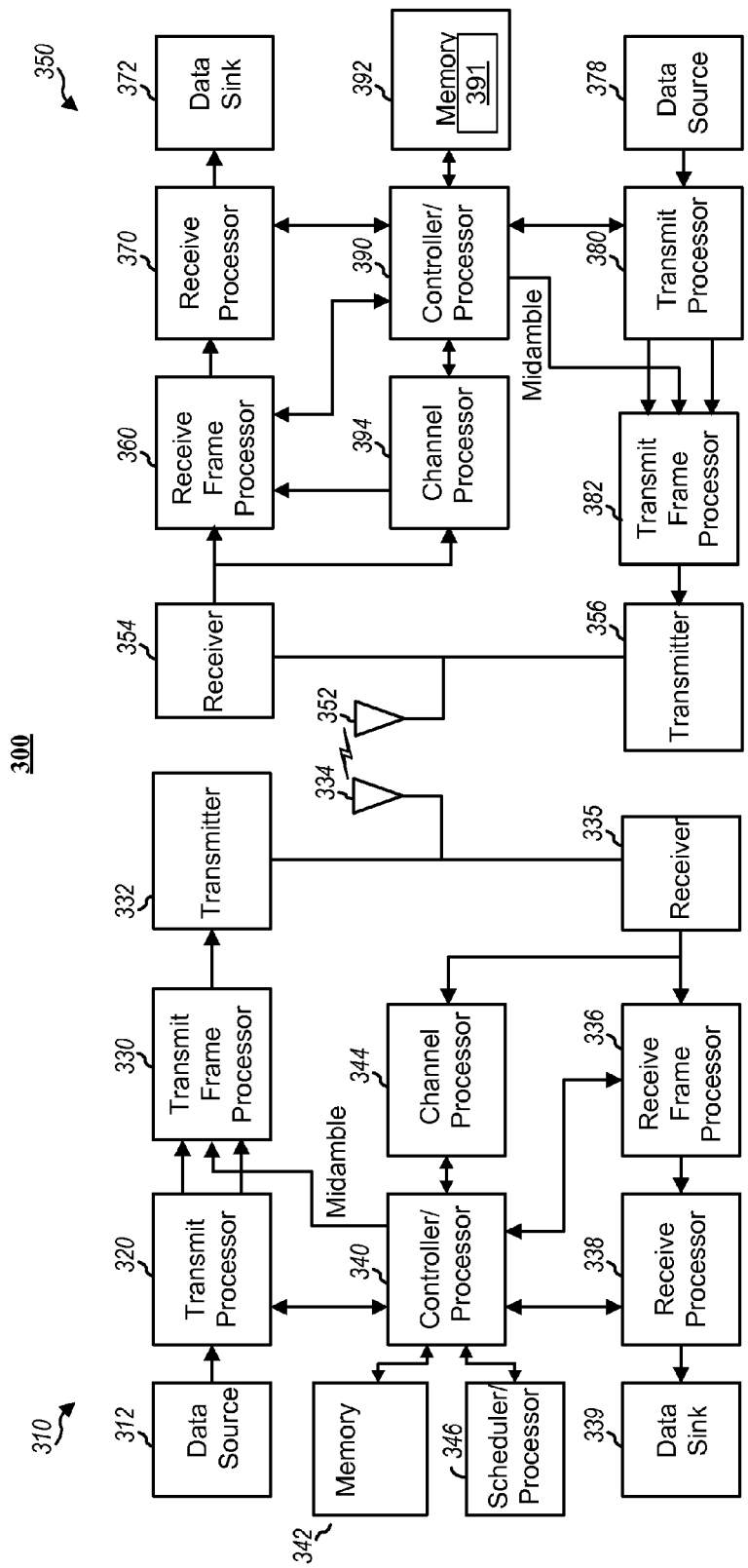
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a network selection module 391 that, when executed by the controller/processor 390, allows the UE 350 to determine which network to use based on the status of the network (e.g., home, roaming, or non-provisioned) for each International Mobile Subscriber Identity (IMSI) of the UE.

Conventionally, a particular network or system is either a home network for a particular IMSI, a roaming network for a particular IMSI, or not provisioned for use with a particular IMSI. It is desirable for a UE to use a home network over a roaming network where practical, as certain benefits exist when using a home network, such as lower cost to use the network.

A UE may select a Public Land Mobile Network (PLMN) either in response to a user selection or automatically. Conventionally, a UE performs a scan/search and selects a particular system on which to communicate in certain situations. Examples of such situations include:

Power up. Upon power up, the UE scans the available radio signals and selects a system.

Loss of coverage. Upon loss of coverage of the existing system, the UE scans the available radio signals and selects a system.

Better system selection. If the currently acquired system is not a preferred system, the UE can periodically scan and search for a better system.

Each GSM/UMTS system is identified by a Public Land Mobile Network ID (PLMN ID), consisting of a Mobile Country Code (MCC) and a Mobile Network Code (MNC). A Mobile Country Code consists of three digits for uniquely identifying the country. The Mobile Network Code consists of two or three digits for identifying the GSM/UMTS application. The PLMN ID can be used to uniquely identify each system.

The UE can learn the PLMN ID of the available cell coverage by acquiring the System Information message broadcasted by the node B (NB). The USIM in the UE can store system information in a PLMN database to facilitate system search and selection. The PLMN database is organized in Elementary Files (EFs) in the USIM.

Figure 4:
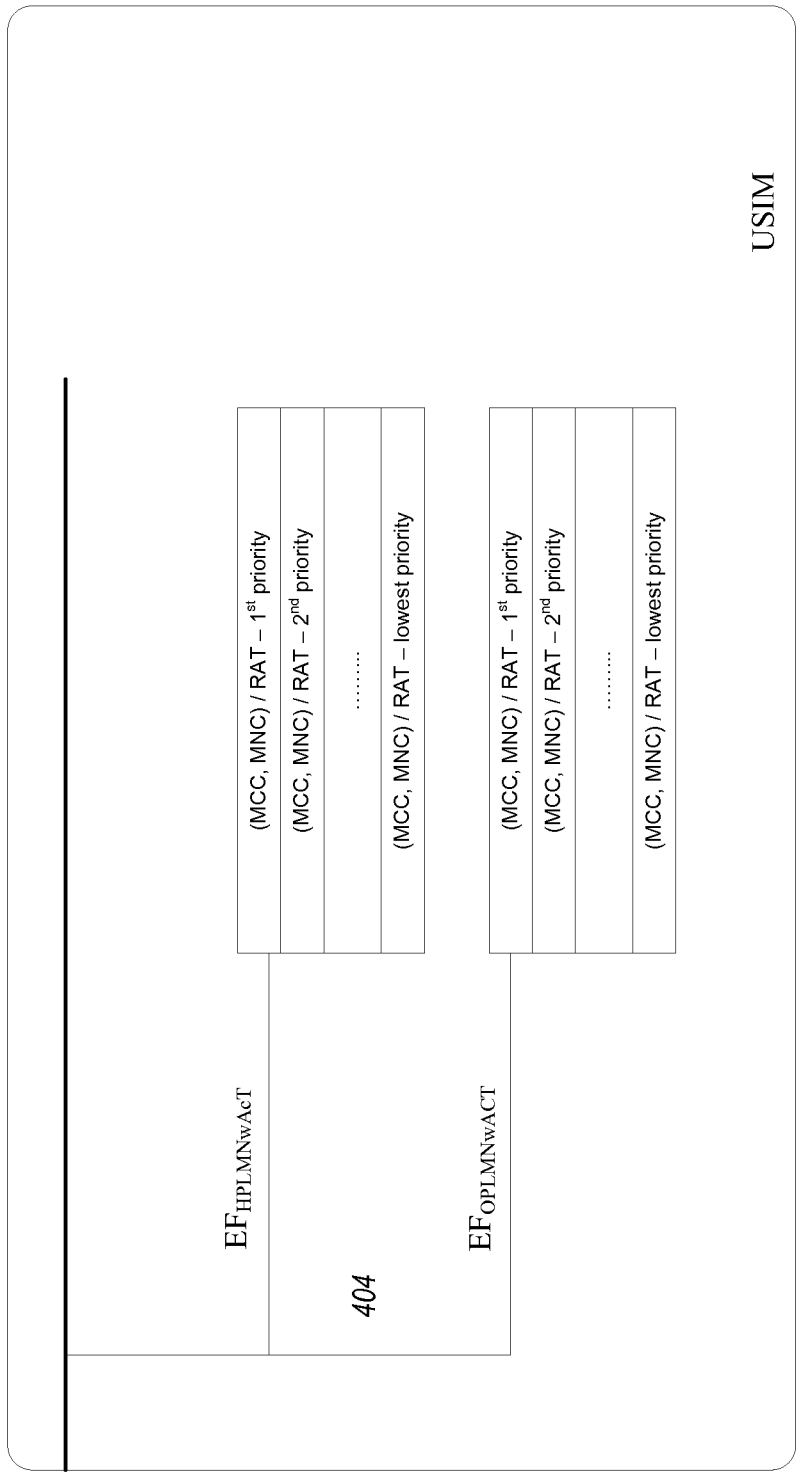
FIG. 4 is a diagram illustrating elementary files used to facilitate system search and selection.

FIG. 4 is a diagram illustrating elementary files (EFs) used to facilitate system search and selection. For example, the EFs 404 can include:

A "HPLMN Selector with Access Technology" EF ($EF_{HPLMNwAcT}$) which contains the list of Home PLMN (HPLMN) IDs and the associated radio access technology (RAT) listed in order of priority of desired use by the UE.

An "Operator controlled PLMN Selector with Access Technology" EF ($EF_{OPLMNwAcT}$) which contains the operator provisioned Roaming PLMN (RPLMN) IDs and the associated radio access technology in order of priority of desired use by the UE.

When a UE performs the system scan/selection, it selects the highest priority available system, with a home system generally being higher priority than a roaming system.

In certain countries, a mobile phone may have more than one Universal Subscriber Identity Module (USIM) which enables the user to make and receive phone calls using different phone numbers. For example, a user may have one personal phone number and one business phone number, both associated with his UE. Each USIM has a unique International Mobile Subscriber Identity (IMSI). Each UE has a International Mobile Equipment Identity (IMEI) which identifies the UE.

When the UE has multiple USIMs, each USIM can be provisioned with its own separate PLMN database. The PLMN databases can be particularly different when the USIMs in question subscribe to different mobile service providers. For example, in the case of a UE with dual USIMs, the UE can have a first USIM associated with one mobile service provider (for example China Mobile using a GSM/TD-SCDMA network) and the second USIM associated with a different mobile service provider (for example China Unicom using a GSM/WCDMA network).

Conventionally such multi-USIM UEs only have one hardware module used by the USIMs at any given time and therefore can only use one network at a time. Therefore both IMSIs register with the same RAT selected from the PLMN selection, as that RAT will be communicating with the UE's hardware module. It is therefore non-trivial to select a highest priority PLMN when multiple PLMN databases exist.

A proposed solution for improving the PLMN selection process for the a multi-USIM UE is described below. One goal of the solution is to select a home network whenever practical to avoid roaming and reduce the charge of making a phone call. For ease of illustration, the description provided below is for a dual USIM UE, but the teachings are generally applicable to UEs with more than one USIM. In the example below a UE has two USIMs, USIM_1 and USIM_2. USIM_1 corresponds to mobile number IMSI_1. USIM_2 corresponds to mobile number IMSI_2.

The example PLMN databases below refer to databases which list the PLMN networks provisioned for a particular IMSI. Home networks are listed in a Home PLMN Database (HPLMN), Roaming networks are listed in a Roaming PLMN Database (RPLMN). Networks not found in either database for a particular IMSI are considered non-provisioned for that particular IMSI. As noted below, USIM_1 corresponds to PLMN database PLMNDB_1 (divided into Home PLMN Database HPLMNDB_1, and Roaming PLMN Database RPLMNDB_1). USIM_2 corresponds to PLMN database PLMNDB_2 (divided into Home PLMN Database HPLMNDB_2, and Roaming PLMN Database RPLMNDB_2).

One method of selecting a PLMN involves scanning the network choices available to the UE. The UE then uses PLMNDB_1 to select the best available PLMN for IMSI_1, called PLMN=x. The status of PLMN=x is then checked in PLMNDB_2 to determine if PLMN=x is Home, Roaming, or Not Provisioned for IMSI_2. The UE also independently uses PLMNDB_2 to select the highest priority available PLMN for IMSI_2, called PLMN=y. The status of PLMN=y is then checked in PLMNDB_1 to determine if PLMN=y is Home, Roaming, or Not Provisioned for IMSI_1. The UE then may select between PLMN=x and PLMN=y based on a preference ranking.

A sample preference ranking table is shown in FIG. 5. In the table a lower ranking number indicates a higher priority choice. As shown in this example, a PLMN that is considered a home network for both IMSI_1 and IMSI_2 will be given a ranking of 1. A PLMN that is considered a home network for one IMSI but is roaming for another will be given a ranking of 2. A PLMN that is considered a home network for one IMSI but is not provisioned for the other will be given a ranking of 3. A PLMN network that is roaming for both IMSIs will be given a ranking of 4. A PLMN that is a roaming network for one IMSI but is not provisioned for the other will be given a ranking of 5.

According to the method described above, using the example ranking shown in FIG. 5, if PLMN=x is a home network for IMSI_1 and a roaming network for IMSI_2 it will receive a rank of 2. If PLMN=y is roaming for both IMSI_1 and IMSI_2 it will receive a rank of 4. The UE would then select PLMN=x as the preferred network in this instance.

If PLMN=x and PLMN=y receive the same ranking, a tie-breaking procedure may be used. A first tie-breaking procedure randomly selects the PLMN. A second tie-breaking procedure employs a hardcoded IMSI priority. For example, if IMSI_1 is given higher priority, then the PLMN that is preferred for IMSI_1 would be selected. In the example where IMSI_1 is given priority and PLMN=x and PLMN=y receive the same ranking, then PLMN=x is selected because it was the network preferred by IMSI_1, the IMSI with the higher priority. A third tie-breaking procedure selects a network based on the UE call history, including factors such as calling frequency and calling time. For example, if IMSI_1 has a higher calling frequency and PLMN=x and PLMN=y receive the same ranking, then PLMN=x is selected because it is the higher priority network of IMSI_1, the IMSI with higher calling frequency. Similar tie-breaking may be based on calling time, higher frequency of received calls, or other call history factors.

Figure 6:
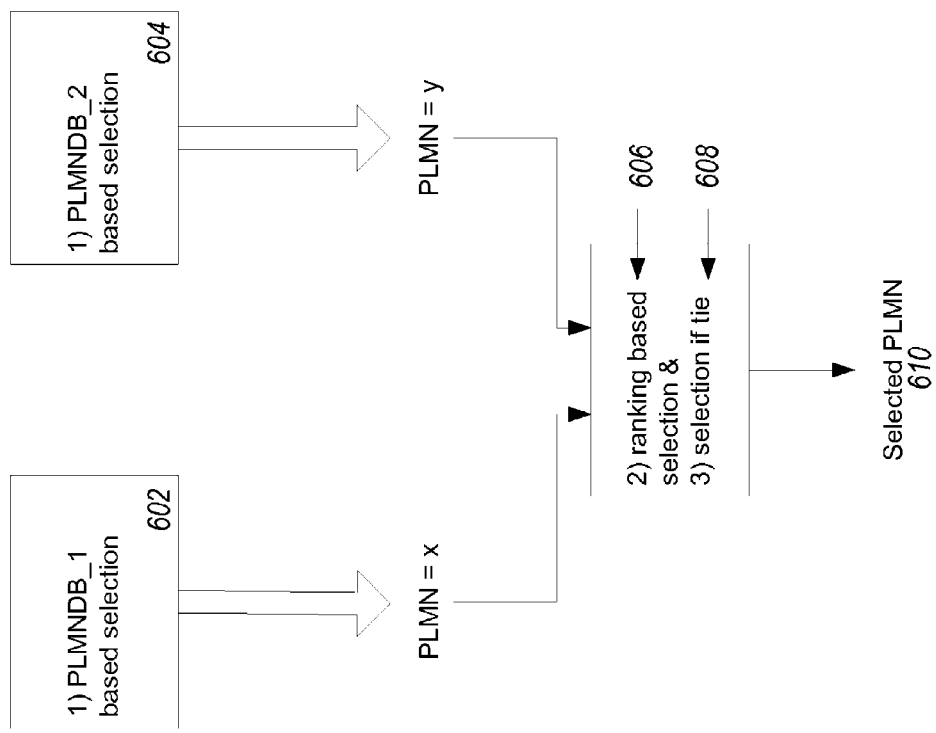
FIG. 6 is a diagram illustrating network selection according to one aspect of the present disclosure.

FIG. 6 shows a PLMN selection scheme according to the above method. A potential preferred network is selected based on PLMNDB_1 602. Another potential preferred network is selected based on PLMNDB_2 604. The ranks of those networks are then compared 606 and the highest ranking PLMN is selected 610. If the ranks are equal, a tie-breaking procedure is employed 608 and a preferred PLMN is selected 610.

Figure 7:
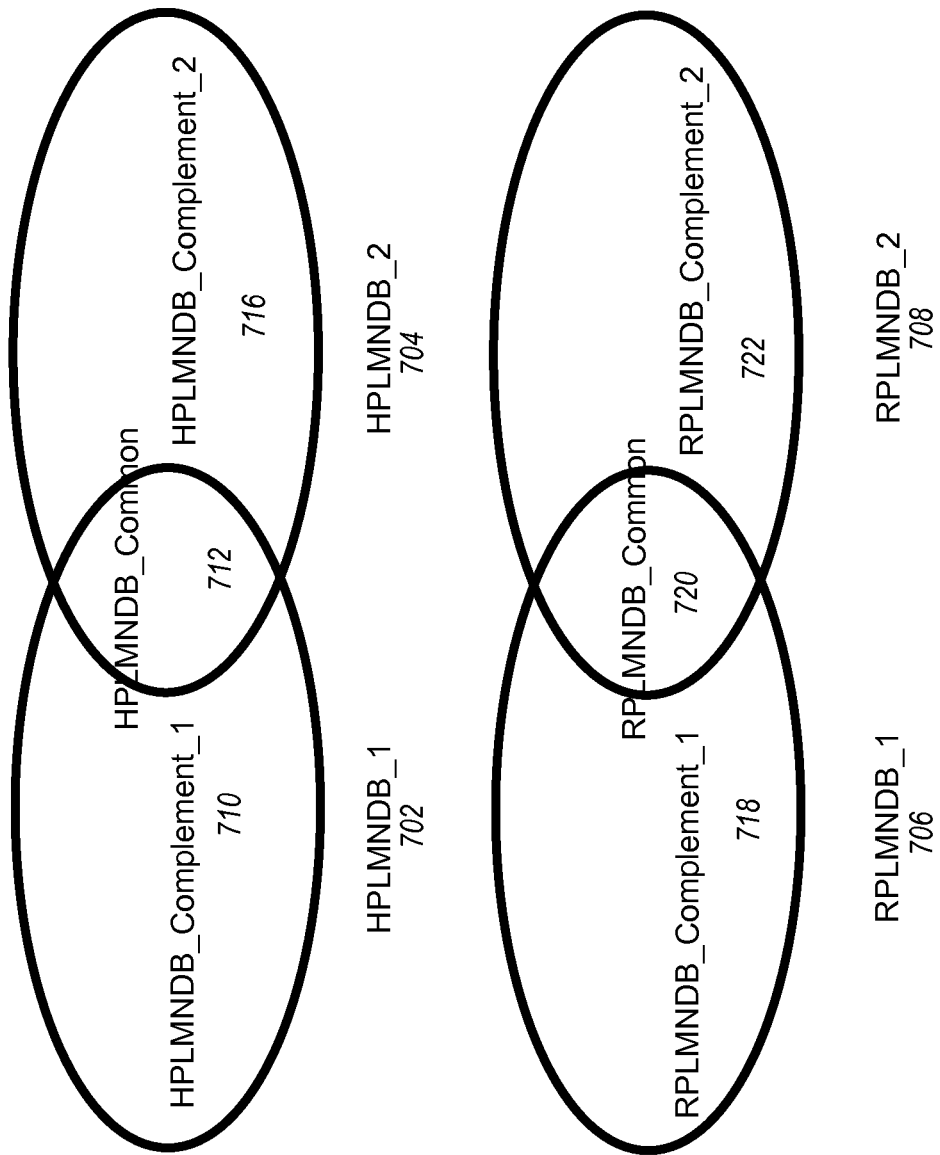
FIG. 7 is a diagram illustrating network preference grouping according to one aspect of the present disclosure.

The above embodiment analyzes the PLMN databases independently. In another embodiment, PLMN selection involves prioritizing PLMNs together for the entire system rather than independently by IMSI, prior to independent selection by each IMSI and comparison of ranking FIG. 7 illustrates a scheme for grouping available networks by their status as home or roaming networks for the respective IMSIs. As seen in FIG. 7, HPLMNDB_1 702 illustrates the home networks for IMSI_1. HPLMNDB_2 704 illustrates the home networks for IMSI_2. RPLMNDB_1 706 illustrates the roaming networks for IMSI_1. RPLMNDB_2 708 illustrates the roaming networks for IMSI_2. HPLMNDB_Common 712 illustrates networks that are home networks to both IMSIs. HPLMNDB_Complement_1 710 illustrates the networks which are only home networks for IMSI_1. HPLMNDB_Complement_2 716 illustrates the networks which are only home networks for IMSI_2. RPLMNDB_Common 720 illustrates the networks that are roaming networks to both IMSIs. RPLMNDB_Complement_1 718 illustrates the networks which are only roaming networks for IMSI_1. RPLMNDB_Complement_2 722 illustrates the networks which are only roaming networks for IMSI_2.

The categories shown in FIG. 7 are then evaluated to re-prioritize PLMNDB_1 and PLMNDB_2. PLMNDB_1 is re-prioritized in the following descending priority order:

1. HPLMNDB_Common
2. HPLMNDB_Complement_1
3. RPLMNDB_Common
4. RPLMNDB_Complement_1

Multiple entries in the same subset still follow the priority order in the original PLMNDB_1. Similarly, PLMNDB_2 is re-prioritized in the following descending priority order:

1. HPLMNDB_Common
2. HPLMNDB_Complement_2
3. RPLMNDB_Common
4. RPLMNDB_Complement_2

Figure 8:
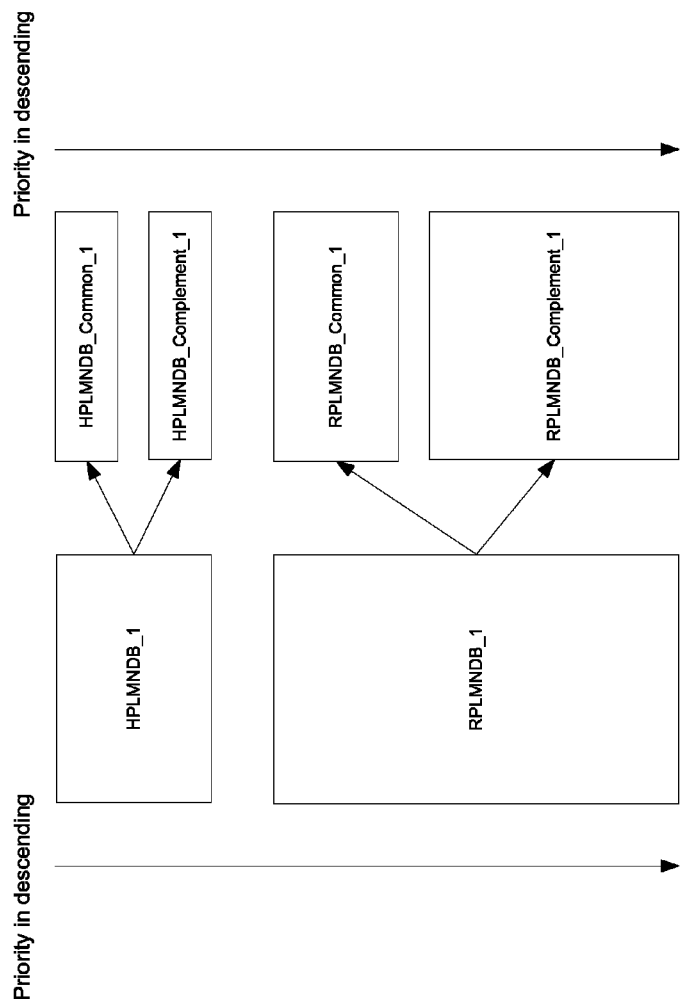
FIG. 8 is a diagram illustrating network preference grouping according to one aspect of the present disclosure.

FIG. 8 illustrates the re-prioritized PLMNDB for IMSI_1. The home database HPLMNDB_1 now has the networks in HPLMNDB_Common as highest priority and the networks in HPLMNDB_Complement_1 as lower priority. The roaming database RPLMNDB_1 now has the networks in RPLMND- B_Common as the higher priority and the networks in RPLMNDB_Complement_1 as lower priority.

With the databases re-prioritized the UE can then follow the selection method pictured in FIG. 6 and described above. The re-prioritized individual IMSIs databases will be more likely to independently choose networks that are also preferred by the other IMSI prior to the ranking comparison. Tie-breaking can also occur, as described above.

Figure 9:
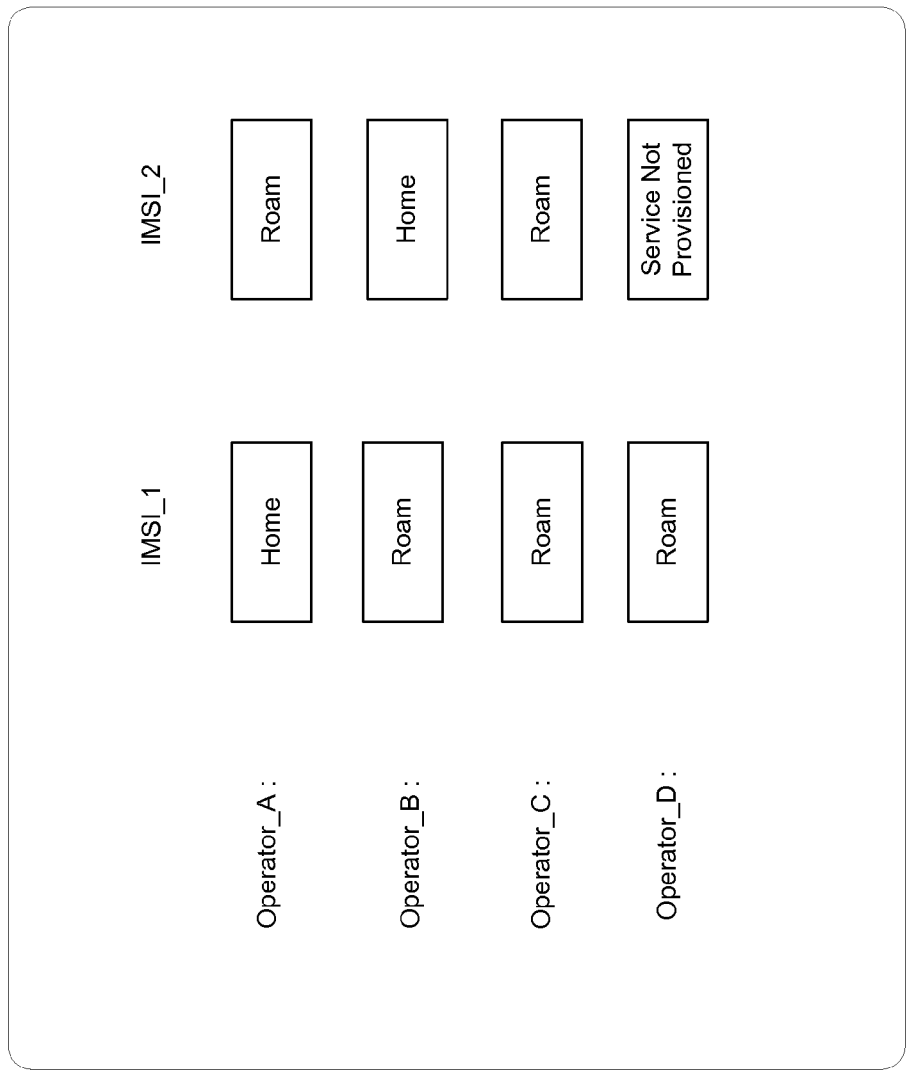
FIG. 9 is a diagram illustrating a user interface for use with network selection according to one aspect of the present disclosure.

Another method for choosing an available network allows for manual PLMN selection, which may be a desirable method when the UE cannot find a PLMN which is home to both IMSIs. When this situation occurs, the UE presents a list of available PLMNs in the coverage area for the user to select manually. One method of doing so would be to display for the user the service provider name of the PLMN along with the PLMN's status (e.g., home, roaming, or not-provisioned) for each IMSI of the user's UE. FIG. 9 is a diagram illustrating a user interface for use with network selection in a UE with multiple IMSIs according to one aspect of the present disclosure. Using the display the user can decide which network to use according to the user's desired result (such as avoiding roaming charges for a particular IMSI). The user can then indicate the choice to the UE, which would then connect to the desired system.

Figure 10:
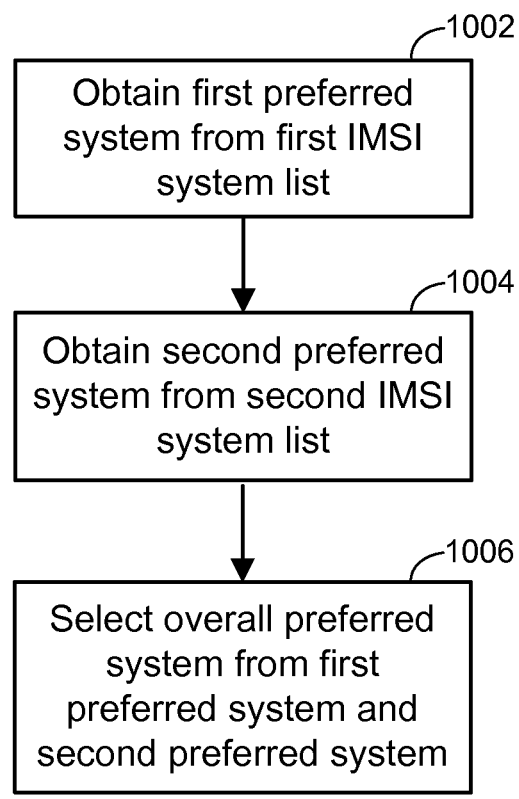
FIG. 10 is a flow diagram illustrating overall system selection according to one aspect of the present disclosure.

FIG. 10 is a flow diagram illustrating overall system selection according to one aspect of the present disclosure. An apparatus, such as the UE 110 is configured to select a priority system from a first IMSI system list as shown in block 1002. The UE is also configured to select a priority system from a second IMSI system list as shown in block 1004. The UE is further configured to then select an overall priority system from the priority systems of the first and second IMSI systems, as shown in block 1006.

Figure 11:
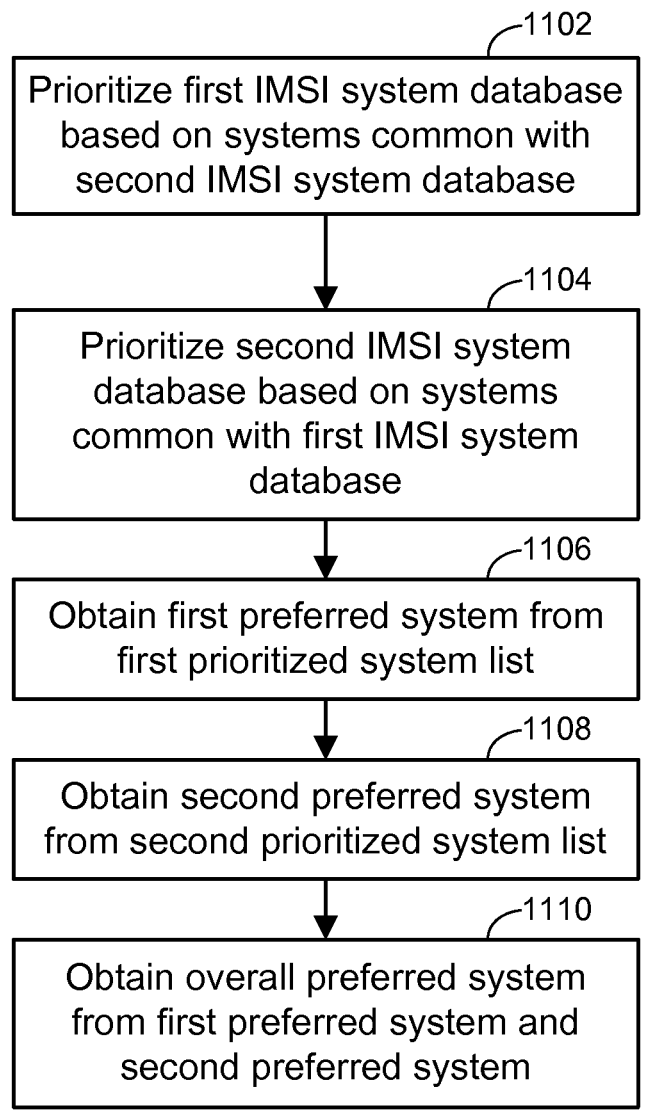
FIG. 11 is a flow diagram illustrating overall system selection according to one aspect of the present disclosure.

FIG. 11 is a flow diagram illustrating overall system selection according to one aspect of the present disclosure. An apparatus, such as the UE 110 is configured to prioritize a first IMSI system database based on systems common with a second IMSI system database as shown in block 1102. The UE is also configured to prioritize the second IMSI system database based on systems common with the first IMSI system database as shown in block 1104. The UE is configured to obtain a priority system from the first prioritized system list as shown in block 1106. The UE is also configured to obtain a priority system from the second prioritized system list as shown in block 1108. The UE is configured to obtain an overall system from the priority systems of the first and second systems as shown in block 1110.

Figure 12:
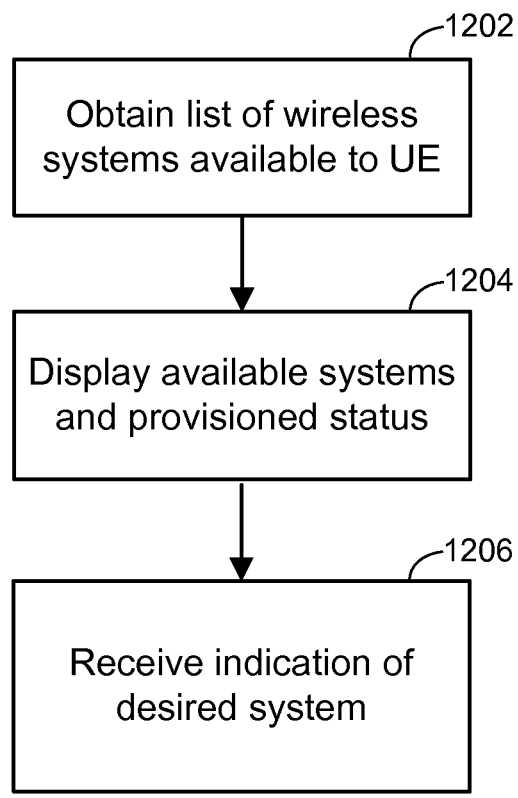
FIG. 12 is a flow diagram illustrating overall system selection according to one aspect of the present disclosure.

FIG. 12 is a flow diagram illustrating overall system selection according to one aspect of the present disclosure. An apparatus, such as the UE 110 is configured to obtain a list of wireless systems available to the UE as shown in block 1202. The UE is also configured to display the available systems and provisioned status of those systems as shown in block 1204. The UE is configured to receive an indication of a desired system as shown in block 1206.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising;
obtaining a first priority system from a first system list of a first International Mobile Subscriber Identity (IMSI) of a user equipment, the first priority system being one of a plurality of systems in the first system list available to the user equipment for a particular call;
obtaining a second priority system from a second system list of a second IMSI of the user equipment, the second priority system being one of a plurality of systems in the second system list available to the user equipment for the particular call; and
selecting an overall system from the first priority system and the second priority system based at least in part on an overall system priority that prioritizes at least:
a system that is home to one IMSI and roaming to another IMSI over a system that is home to one IMSI but not in a system list of another IMSI;
a system that is home to one IMSI but not in a system list of another IMSI over a system that is roaming to both the first IMSI and the second IMSI; or
a system that is roaming to both the first IMSI and the second IMSI over a system that is roaming to one IMSI but not in a system list of another IMSI.

2. The method of claim 1, in which the overall system priority further prioritizes a system that is home to both the first IMSI and the second IMSI over a system that is home to one IMSI and roaming to another IMSI.

3. The method of claim 1, in which the selecting comprises at least one of:
analyzing a call history to select the overall system,
checking the overall system priority to select the overall system, and
randomly selecting the overall system when the first priority system and the second priority system are equally prioritized.

4. A method of wireless communication, comprising:
determining a first system list database of a first International Mobile Subscriber Identity (IMSI) of a user equipment;
determining a second system list database of a second IMSI of the user equipment;
comparing the first system list database and second system list database to identify at least one system that appears in the first system list database and second system list database;
prioritizing the first system list database based on whether systems in the first system list database are common to the second system list database and also based at least in part on an overall system priority that prioritizes at least:
a system that is home to one IMSI and roaming to another IMSI over a system that is home to one IMSI but not in a system list of another IMSI;
a system that is home to one IMSI but not in a system list of another IMSI over a system that is roaming to both the first IMSI and the second IMSI; or
a system that is roaming to both the first IMSI and the second IMSI over a system that is roaming to one IMSI but not in a system list of another IMSI;
prioritizing the second system list database based on whether systems in the second system list database are common to the first system list database;
obtaining a first priority system from the first prioritized system list database of the first IMSI;
obtaining a second priority system from the second prioritized system list database of the second IMSI; and
selecting an overall system from the first priority system and the second priority system.

5. The method of claim 4, in which the overall system priority further prioritizes a system that is home to both the first IMSI and the second IMSI above a system that is home to one IMSI but not another IMSI.

6. A system configured for wireless communication in a multicarrier radio access network, the system comprising:
means for obtaining a first priority system from a first system list of a first International Mobile Subscriber Identity (IMSI) of a user equipment, the first priority system being one of a plurality of systems in the first system list available to the user equipment for a particular call;
means for obtaining a second priority system from a second system list of a second IMSI of a user equipment, the second priority system being one of a plurality of systems in the second system list available to the user equipment for the particular call; and
means for selecting an overall system from the first priority system and the second priority system based at least in part on an overall system priority that prioritizes at least:
a system that is home to one IMSI and roaming to another IMSI over a system that is home to one IMSI but not in a system list of another IMSI;
a system that is home to one IMSI but not in a system list of another IMSI over a system that is roaming to both the first IMSI and the second IMSI; or
a system that is roaming to both the first IMSI and the second IMSI over a system that is roaming to one IMSI but not in a system list of another IMSI.

7. A system configured for wireless communication in a multicarrier radio access network, the system comprising:
means for determining a first system list database of a first International Mobile Subscriber Identity (IMSI) of a user equipment;
means for determining a second system list database of a second IMSI of the user equipment;
means for comparing the first system list database and second system list database to identify at least one system that appears in the first system list database and second system list database;

means for prioritizing the first system list database based on whether systems in the first system list database are common to the second system list database and also based at least in part on an overall system priority that prioritizes at least:
- a system that is home to one IMSI and roaming to another IMSI over a system that is home to one IMSI but not in a system list of another IMSI;
- a system that is home to one IMSI but not in a system list of another IMSI over a system that is roaming to both the first IMSI and the second IMSI; or
- a system that is roaming to both the first IMSI and the second IMSI over a system that is roaming to one IMSI but not in a system list of another IMSI;

means for prioritizing the second system list database based on whether systems in the second system list database are common to the first system list database;

means for obtaining a first priority system from the first prioritized system list database of the first IMSI;

means for obtaining a second priority system from the second prioritized system list database of the second IMSI; and means for selecting an overall system from the first priority system and the second priority system.

8. A computer program product, comprising:
a non-transitory computer-readable medium having program code recorded thereon, the program code comprising:
- program code to obtain a first priority system from a first system list of a first International Mobile Subscriber Identity (IMSI) of a user equipment, the first priority system being one of a plurality of systems in the first system list available to the user equipment for a particular call;
- program code to obtain a second priority system from a second system list of a second IMSI of a user equipment, the second priority system being one of a plurality of systems in the second system list available to the user equipment for the particular call; and
- program code to select an overall system from the first priority system and the second priority system based at least in part on an overall system priority that prioritizes at least:
  - a system that is home to one IMSI and roaming to another IMSI over a system that is home to one IMSI but not in a system list of another IMSI;
  - a system that is home to one IMSI but not in a system list of another IMSI over a system that is roaming to both the first IMSI and the second IMSI; or
  - a system that is roaming to both the first IMSI and the second IMSI over a system that is roaming to one IMSI but not in a system list of another IMSI.

9. A computer program product, comprising:
a non-transitory computer-readable medium having program code recorded thereon, the program code comprising:
- program code to determine a first system list database of a first International Mobile Subscriber Identity (IMSI) of a user equipment;
- program code to determine a second system list database of a second IMSI of the user equipment;
- program code to compare the first system list database and second system list database to identify at least one system that appears in the first system list database and second system list database;
- program code to prioritize the first system list database based on whether systems in the first system list database are common to the second system list database and also based at least in part on an overall system priority that prioritizes at least:
  - a system that is home to one IMSI and roaming to another IMSI over a system that is home to one IMSI but not in a system list of another IMSI;
  - a system that is home to one IMSI but not in a system list of another IMSI over a system that is roaming to both the first IMSI and the second IMSI; or
  - a system that is roaming to both the first IMSI and the second IMSI over a system that is roaming to one IMSI but not in a system list of another IMSI;
- program code to prioritize the second system list database based on whether systems in the second system list database are common to the first system list database;
- program code to obtain a first priority system from the first prioritized system list database of the first IMSI;
- program code to obtain a second priority system from the second prioritized system list database of the second IMSI; and
- program code to select an overall system from the first priority system and the second priority system.

10. A network controller configured for wireless communication, the network controller comprising:
at least one processor; and
a memory coupled to the at least one processor, wherein the at least one processor is configured:
- to obtain a first priority system from a first system list of a first International Mobile Subscriber Identity (IMSI) of a user equipment, the first priority system being one of a plurality of systems in the first system list available to the user equipment for a particular call;
- to obtain a second priority system from a second system list of a second IMSI of a user equipment, the second priority system being one of a plurality of systems in the second system list available to the user equipment for the particular call; and
- to select an overall system from the first priority system and the second priority system based at least in part on an overall system priority that prioritizes at least:
  - a system that is home to one IMSI and roaming to another IMSI over a system that is home to one IMSI but not in a system list of another IMSI;
  - a system that is home to one IMSI but not in a system list of another IMSI over a system that is roaming to both the first IMSI and the second IMSI; or
  - a system that is roaming to both the first IMSI and the second IMSI over a system that is roaming to one IMSI but not in a system list of another IMSI.

11. The network controller of claim 10 in which the overall system priority further prioritizes a system that is home to both the first IMSI and the second IMSI over a system that is home to one IMSI and roaming to another IMSI.

12. A network controller configured for wireless communication, the network controller comprising:
at least one processor; and
a memory coupled to the at least one processor, wherein the at least one processor is configured:
- to determine a first system list database of a first International Mobile Subscriber Identity (IMSI) of a user equipment;
- to determine a second system list database of a second IMSI of the user equipment;

to compare the first system list database and second system list database to identify at least one system that appears in the first system list database and second system list database;

to prioritize the first system list database based on whether systems in the first system list database are common to the second system list database and also based at least in part on an overall system priority that prioritizes at least:

a system that is home to one IMSI and roaming to another IMSI over a system that is home to one IMSI but not in a system list of another IMSI;

a system that is home to one IMSI but not in a system list of another IMSI over a system that is roaming to both the first IMSI and the second IMSI; or a system that is roaming to both the first IMSI and the second IMSI over a system that is roaming to one IMSI but not in a system list of another IMSI;

to prioritize the second system list database based on whether systems in the second system list database are common to the first system list database;

to obtain a first priority system from the first prioritized system list database of the first IMSI;

to obtain a second priority system from the second prioritized system list database of the second IMSI; and to select an overall system from the first priority system and the second priority system.

13. The network controller of claim 12, in which the overall system priority further prioritizes a system that is home to both the first IMSI and the second IMSI above a system that is home to one IMSI but not another IMSI.

\* \* \* \* \*